US010284606B2

(12) United States Patent
Bertin et al.

(10) Patent No.: US 10,284,606 B2
(45) Date of Patent: May 7, 2019

(54) SETTING UP COMMUNICATION BETWEEN A WEB APPLICATION AND A TERMINAL

(71) Applicant: Orange, Paris (FR)

(72) Inventors: Emmanuel Bertin, Luc-sur-Mer (FR); Stephane Cazeaux, Authie (FR)

(73) Assignee: ORANGE, Paris (FR)

( * ) Notice: Subject to any disclaimer, the term of this patent is extended or adjusted under 35 U.S.C. 154(b) by 119 days.

(21) Appl. No.: 14/310,797

(22) Filed: Jun. 20, 2014

(65) Prior Publication Data

US 2014/0379932 A1    Dec. 25, 2014

(30) Foreign Application Priority Data

Jun. 21, 2013  (FR) ...................... 13 55939

(51) Int. Cl.
*H04L 29/08* (2006.01)
*H04L 29/06* (2006.01)

(52) U.S. Cl.
CPC ........ *H04L 65/1069* (2013.01); *H04L 67/141* (2013.01); *H04L 69/24* (2013.01); *H04L 65/1006* (2013.01)

(58) Field of Classification Search
CPC .............. H04L 67/141; H04L 65/1069; H04L 65/1006
USPC ........................................................ 709/227
See application file for complete search history.

(56) References Cited

U.S. PATENT DOCUMENTS

| | | | | |
|---|---|---|---|---|
| 6,831,915 | B1 * | 12/2004 | Beyschlag | H04L 29/06 370/352 |
| 2001/0014878 | A1 * | 8/2001 | Mitra | G06Q 20/10 705/39 |
| 2003/0233457 | A1 * | 12/2003 | Basilier | H04L 29/06 709/227 |
| 2004/0215794 | A1 * | 10/2004 | Lauer | H04W 76/027 709/230 |
| 2006/0080672 | A1 * | 4/2006 | Smith | G06F 1/3209 719/317 |
| 2011/0002328 | A1 * | 1/2011 | Hansen | H04Q 3/62 370/352 |
| 2011/0072144 | A1 * | 3/2011 | Fikouras | H04L 65/1016 709/230 |
| 2011/0122827 | A1 * | 5/2011 | Bjorsell | H04W 8/02 370/328 |

(Continued)

OTHER PUBLICATIONS

Dutton, "Getting started with WebRTC," url: http://web.archive.org/web/20120725021939/http://www.html5rocks.com/en/tutorials/webrtc/basics/.*

(Continued)

*Primary Examiner* — Kevin T Bates
*Assistant Examiner* — Chen-Liang Huang
(74) *Attorney, Agent, or Firm* — David D. Brush; Westman, Champlin & Koehler, P.A.

(57) ABSTRACT

A method and apparatus are provided for setting up a communications session between an instance of a web application installed in a terminal and a called entity. The method includes sending a first request for setting up a communications session between the application instance and the called entity, the first request being formulated in a first protocol; receiving a response indicating that it is not possible to route the first request, and sending a second request for setting up the communications session formulated in a second protocol.

8 Claims, 4 Drawing Sheets

(56) References Cited

U.S. PATENT DOCUMENTS

| | | | | |
|---|---|---|---|---|
| 2011/0170692 | A1* | 7/2011 | Konrad | H04L 9/002 380/260 |
| 2013/0246173 | A1* | 9/2013 | Berkley | G06Q 30/02 705/14.53 |
| 2014/0032627 | A1* | 1/2014 | Lorenz | H04L 65/4076 709/201 |
| 2014/0223453 | A1* | 8/2014 | Li | G06F 9/547 719/330 |
| 2014/0256286 | A1* | 9/2014 | Rangarajan | H04L 63/205 455/410 |

OTHER PUBLICATIONS

Galea, "The main SIP Invite Header Fields explained," Tweet, Apr. 9, 2014.*

French Search Report and Written Opinion dated Feb. 21, 2014 for corresponding French Patent Application No. 1355939, filed Jun. 21, 2013.

J. Uberti et al., "JavaScript Session Establishment Protocol; draft-ietf-rtcweb-jsep-00.txt", Javascript Session Establishment Protocol; Draft IETF RTCWEB JSEP OO.TXT, Internet Engineering Task Force, IETF, StandardWorkingDraft, Internet Society (ISOC) 4, Rue Des Falaises Ch0 1205 Geneva, Switzerland, Mar. 4, 2012 (Mar. 4, 2012), pp. 1-27, XP015081017.

T. Reddy et al., "Considerations with WebRTC in mobile Networks; draft-reddy-rtcweb-mobile-03.txt", Considerations with WEBRTC in Mobile Networks Draft Reddy RTCWEB Mobile 03.txt, Internet Engineering Task Force, IETF, StandardWorkingDraft, Internet Society (ISOC) 4, Rue Des Falaises Ch- 1205, Geneva, Switzerland, May 9, 2013 (May 9, 2013), pp. 1-16, XP015091096.

Sam Dutton, "Getting Started with WebRTC," HTML5 Rocks, Jul. 23, 2012, Web Feb. 21, 2014, 16 pages.

* cited by examiner

SETTING UP COMMUNICATION BETWEEN A WEB APPLICATION AND A TERMINAL

FIELD OF THE DISCLOSURE

The invention lies in the field of telecommunications, and more particularly in the field of web applications.

BACKGROUND OF THE DISCLOSURE

In known manner, a web application (or "webapp") is software downloaded into an instance of a browser of a user's terminal and it is executed within that instance of the browser of said terminal.

Also in known manner, a browser serves to communicate with the world of the web, i.e. to communicate with remote servers via the Internet.

A mechanism known as web real time communication (webRTC) enables real time communications to be established between two browsers. A web application downloaded into each browser enables communications streams to be sent and received.

The mechanisms enabling calls to be received and sent are not specified in the work concerning webRTC and implementation thereof is left to each service supplier.

Emerging work is seeking to establish communications services by causing signaling messages to transit via a web transport protocol, e.g. the Websocket protocol. The Websocket protocol is a web transport protocol defined by the Internet engineering task force (IETF) in its request for comments (RFC) 6455. The Websocket protocol is a data transport protocol. It enables a communications channel to be set up and used between a browser and a remote server, typically a web server. This communications channel is referred to as a "Websocket connection" and it is a bidirectional channel with full duplex, i.e. a bidirectional channel in which sending and receiving can take place simultaneously between the browser and the web server. Other web transport protocols also exist, such as for example the Bayeux protocol (http://svn.cometd.com/trunk/bayeux/bayeux.html).

Research work is being carried out in particular on new communications mechanisms adapted to the world of the web and relying on a web transport protocol.

Those mechanisms are adapted in particular for setting up a communications session with an entity connected to the Internet, e.g. a web server, while relying on a protocol that is defined for the world of the web.

Such a protocol serves in particular to define commands for use in initializing a communications session.

Nevertheless, there exist certain entities, in particular terminals using the session initiation protocol (SIP), that do not understand the commands provided by that protocol and that must be reached by using some other protocol, e.g. SIP.

At present, it is not possible for a web browser to determine which protocol needs to be used to call a distant entity.

SUMMARY

An exemplary embodiment of the invention relates to a method of setting up a communications session between an instance of a web application installed in a terminal and a called entity.

According to an embodiment of the invention, the method comprises the following steps performed by said terminal:

sending a first request to set up a communications session between said application instance and said called entity, said first request being formulated in a first protocol;

receiving a response to said first request indicating that it is not possible to route said first request; and after receiving said response, sending a second request to set up said communications session, said second request being formulated in a second protocol.

In order to set up a communications session, a first request formulated in a first protocol is sent by a calling terminal, which terminal includes a web application instance.

In the event of it not being possible for the request to succeed, i.e. when the request cannot be routed all the way to the called entity, a response is received by the terminal.

If the reason for the failure is due to the fact that the called entity is not suitable for communicating using the first protocol, the terminal converts the first request into a second request formulated in a second protocol.

The method thus enables an instance of a web application in a terminal to set up a communications session with an entity that communicates using the first protocol, or with an entity that communicates using the second protocol.

The method thus enables a calling entity such as an instance of a web application to set up a communications session with a called entity while not knowing a priori the communications protocol that is accepted by the called entity, e.g. without knowing whether the called entity is a conventional telephone terminal or an instance of a web application.

In a particular implementation of the method of setting up a communications session, the second protocol is a session initiation protocol (SIP).

SIP is a protocol that is adapted, possibly while using known protocol-changing gateways, to reach any type of terminal connected to a conventional telecommunications network, i.e. a terminal that is not connected to the world of the Internet.

In a particular implementation of the method of setting up a communications session, said response contains at least one session protocol parameter.

According to a particular characteristic, such a parameter may for example be a parameter indicating the protocol that should be used for reaching the called entity.

According to another characteristic that may be used on its own or in combination with the preceding characteristic, such a parameter is a parameter for use in converting the first request into a second request.

Converting the first request formulated in a first protocol into a second request formulated in a second protocol thus makes use of at least one second protocol parameter as received in the response to the first request. The parameter(s) serve(s) to lighten the workload of conversion in the terminal seeking to set up a session by avoiding any need for it to issue an additional request for the data needed to perform said conversion.

According to a particular characteristic of the method of setting up a communications session, said first request contains an instance identifier of said application instance and an identifier of the called entity, said instance identifier being obtained during a prior registration step.

The instance identifier is an identifier serving to identify said application instance from among the application instances that are connected. The instance identifier serves to identify the application instance in unique manner in the network.

In a particular implementation of the method of setting up a communications session, said response contains a session identifier generated for said communications session and said session identifier is inserted in said second request.

The session identifier is an identifier enabling the communications session that is to be set up to be identified in unique manner.

This session identifier enables the connection server to associate a received second request with a received first request. Since the verifications needed for processing a request were performed on receiving the first request, there is no need to perform new verifications once more. This serves to lighten the processing of the second request.

According to a particular characteristic, the method of setting up a communications session includes a step of receiving a response to said second request, said response indicating a refusal to set up a communications session in the event of said session identifier being invalid.

By way of example, a non-valid session identifier is an identifier generated by an unauthorized entity or an identifier generated for a first request for a first communications session and transmitted in a second request for a second communications session, or indeed an identifier possessing a validity period that has expired.

A response to the second request indicating refusal to set up the communications session enables the user to know that the session cannot be set up, and possibly also to know the reasons.

An embodiment of the invention also provides a method of processing a request to set up a communications session between an instance of a web application installed in a terminal and a called entity. According to an embodiment of invention, the processing comprises the following steps performed by a connection server:
  receiving a first request to set up a communications session between said web application instance and said called entity, said first request being formulated in a first protocol;
  sending a response to said first request indicating that it is not possible to route said first request; and
  after sending said response, receiving a second request for setting up said communications session, said second request being formulated in a second protocol.

The processing method serves to lighten the task of the connection server by off-loading the conversion work onto the terminal.

According to a particular characteristic of the method of processing a request to set up a communications session, the second request includes a session identifier, the method includes a step of verifying the validity of said session identifier, and said second request is not sent if said session identifier is invalid.

The session identifier makes it possible to make the system secure by allowing communication to be set up only when the identifier is valid.

An embodiment of the invention also provides a terminal comprising:
  a first send module for sending a first request for setting up a communications session between an instance of a web application and a called entity, said first request being formulated in a first protocol;
  a receive module for receiving a response to said first request indicating that it is not possible to route said first request; and
  a second send module for sending, after said response has been received, a second request for setting up said communications session, said second request being formulated in a second protocol.

An embodiment of the invention also provides a connection server comprising:
  a first receive module for receiving a first request for setting up a communications session between an instance of a web application and a called entity, said first request being formulated in a first protocol;
  a send module for sending a response to said first request indicating that it is not possible to route said first request; and
  a second receive module, for receiving, after sending said response, a second request for setting up said communications session, said second request being formulated in a second protocol.

An embodiment of the invention also provides a computer program product including instructions for performing the steps of the above-described method of setting up a communications session when loaded in and executed by a processor.

Finally, an embodiment of the invention also provides a computer program product including instructions for performing the steps of the above-described method of processing a request to set up a communications session, when the program is loaded in and executed by a processor.

BRIEF DESCRIPTION OF THE DRAWINGS

Other features and advantages of the present invention appear from the following description of implementations given as non-limiting examples and with reference to the accompanying drawings, in which.

DETAILED DESCRIPTION OF ILLUSTRATIVE EMBODIMENTS

An embodiment of the invention is performed by means of software and/or hardware components. In this context, the term "module" may correspond in the present document equally well to a software component or to a hardware component or to a set of hardware and/or software components suitable for performing a function or a set of functions, as described below for the module in question.

A software component corresponds to one or more computer programs, one or more subprograms of a program, or more generally to any program element or software element. Such a software component is stored in memory and then loaded and executed by a data processor of a physical entity (a terminal, a server, a gateway, a set-top box, a router, etc.), and it is capable of accessing the hardware resources of said physical entity (memories, storage media, communications bus, electronic input/output cards, user interfaces, etc.).

In the same manner, a hardware component corresponds to any element in a hardware assembly. It may comprise a programmable hardware component or it may have a processor incorporated therein for executing software, e.g. an integrated circuit, a smart card, or an electronic card for executing firmware, etc.

There follows a description with reference to FIGS. 1 to 4 of an implementation of a method of setting up a communications session and a method of processing a request to set up a communications session.

Figure 1:
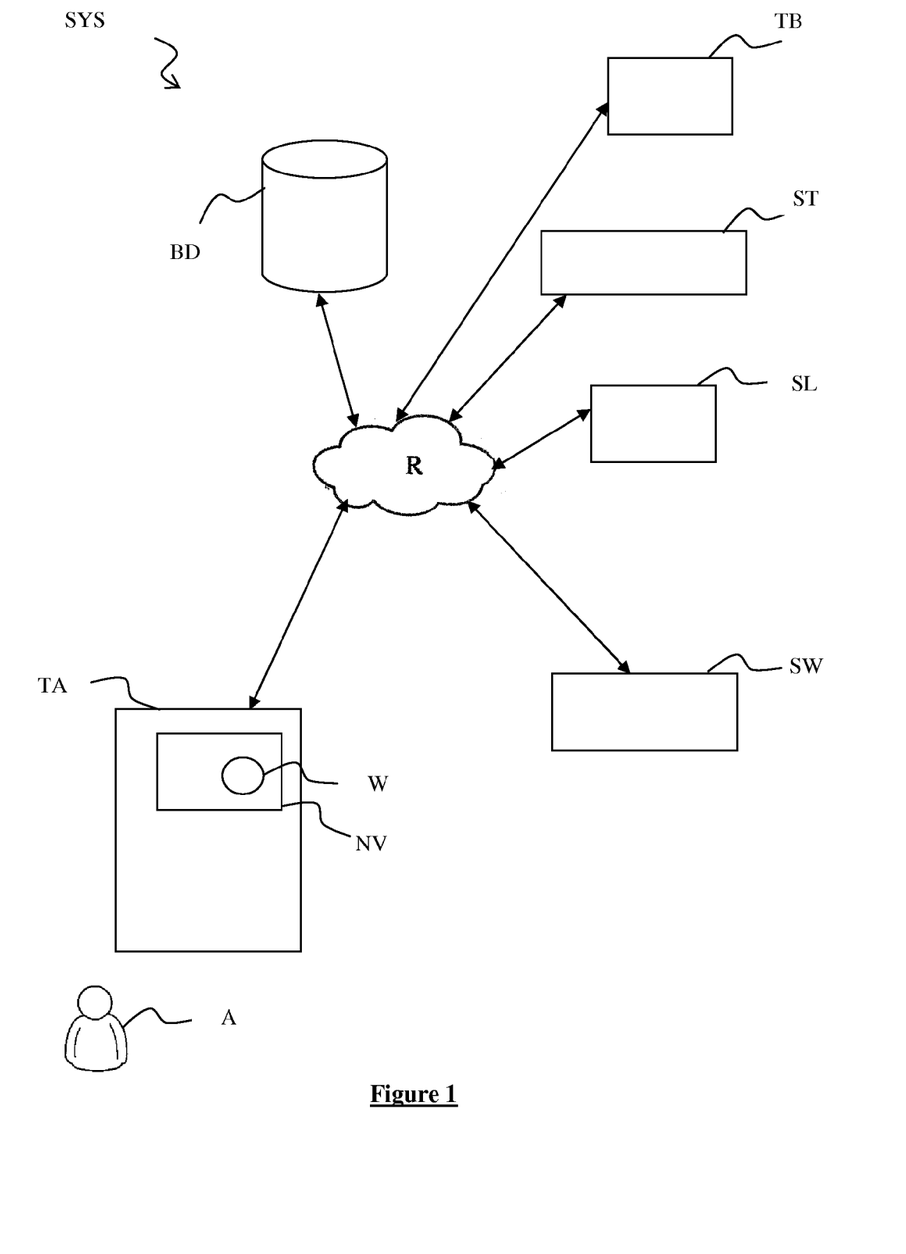
FIG. 1 is a diagram showing a system in an embodiment of the invention.

With reference to FIG. 1, a system SYS comprises a terminal TA of a user A, a connection server SW, a management server SL, and a database BD suitable for communicating with one another via a communications network R.

The communications network R comprises the Internet and/or an Intranet.

By way of example, the terminal TA is a PC type computer.

Alternatively, the terminal TA is a mobile terminal.

More generally, the terminal TA is a piece of equipment suitable for accessing the network R by means of a web browser.

The database BD comprises firstly a database for registering web applications, and secondly a routing table.

Alternatively, the database for registering web applications and the routing table could be stored in different databases.

Also by way of an alternative, the system SYS includes a plurality of routing tables and a plurality of registration databases.

The system SYS also includes a terminal TB and a transmission server ST.

The transmission server ST is suitable for receiving signaling messages, e.g. SIP type requests coming from a first entity connected to the network R and for forwarding them to a second entity specified in said signaling message.

The transmission server ST is also suitable for receiving one or more data streams and for forwarding them.

The terminal TB is suitable for communicating with the transmission server ST via the network R. In particular, the terminal TB is suitable for receiving and for sending SIP type signaling messages and for sending and receiving one or more media streams.

As an alternative, the terminal TB is a terminal connected to the public switched telephone network (PSTN) and is suitable for communicating with the transmission server ST via a gateway adapted to convert SIP messages into PSTN signals, and vice versa.

More generally, the terminal TB is an entity suitable for communicating with the network R and it is not connected to the Internet world.

In the implementation described, the connection server SW, the management server SL, and the transmission server ST are three different entities. As an alternative, these entities could be grouped together as one or two entities.

Figure 2:
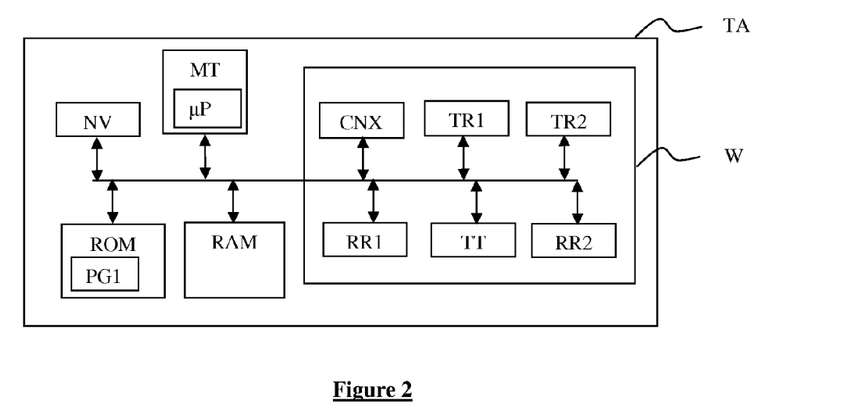
FIG. 2 is a block diagram representing a terminal suitable for performing the steps of a method of setting up a communications session in an implementation of the invention.

FIG. 2 is a block diagram showing a terminal TA in one embodiment.

In conventional manner, the terminal TA comprises in particular a processor unit MT having a microprocessor, a read only memory (ROM), and a random access memory (RAM). The terminal TA may include in conventional and non-exhaustive manner the following elements: a keyboard, a screen, a microphone, a loudspeaker, a disk reader, storage means, . . . .

The ROM has registers storing a computer program PG1 including program instructions adapted to perform a method of setting up a communications session in an implementation of the invention described below with reference to FIG. 5.

The terminal TA contains a browser NV.

The browser NV is a web browser, i.e. software designed for consulting the world wide web.

The terminal TA also has a connection module CNX, a first send module TR1, a first receive module RR1, a second send module TR2, a second receive module RR2, and a processor module TT.

Figure 3:
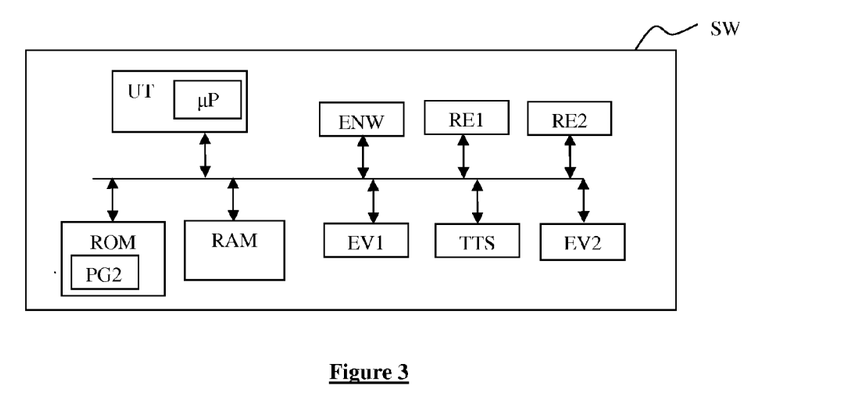
FIG. 3 is a block diagram representing a server suitable for performing the steps of a method of setting up a communications session in an implementation of the invention.

FIG. 3 is a block diagram showing a connection server SW in one embodiment.

The connection server SW may for example be a server that comprises in conventional manner specifically a processor unit UT having a microprocessor, a ROM, and a RAM.

The ROM includes registers storing a computer program PG2 including program instructions adapted to perform a method of processing a request to set up a communications session in an implementation of the invention described below with reference to FIG. 5.

The connection server SW also includes an application registration module ENW, a first receive module RE1, a first send module EV1, a second receive module RE2, a second send module EV2, and a processor module TTS.

Figure 4:
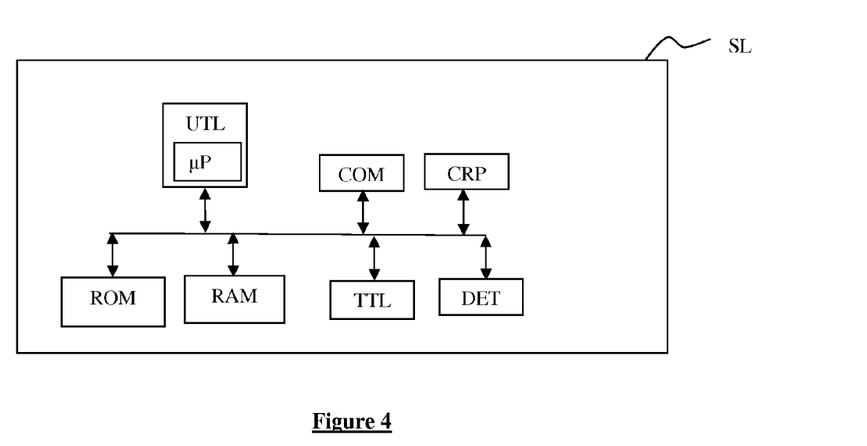
FIG. 4 is a block diagram representing a management server in an embodiment of the invention.

FIG. 4 is a block diagram showing a management server SL in one embodiment.

The management server SL may for example be a server comprising in conventional manner specifically a processor unit UTL having a microprocessor, a ROM, and a RAM.

The connection server SW also includes a communications module COM, a construction module CRP, a determination module DET, and a processor module TTL.

Figure 5:
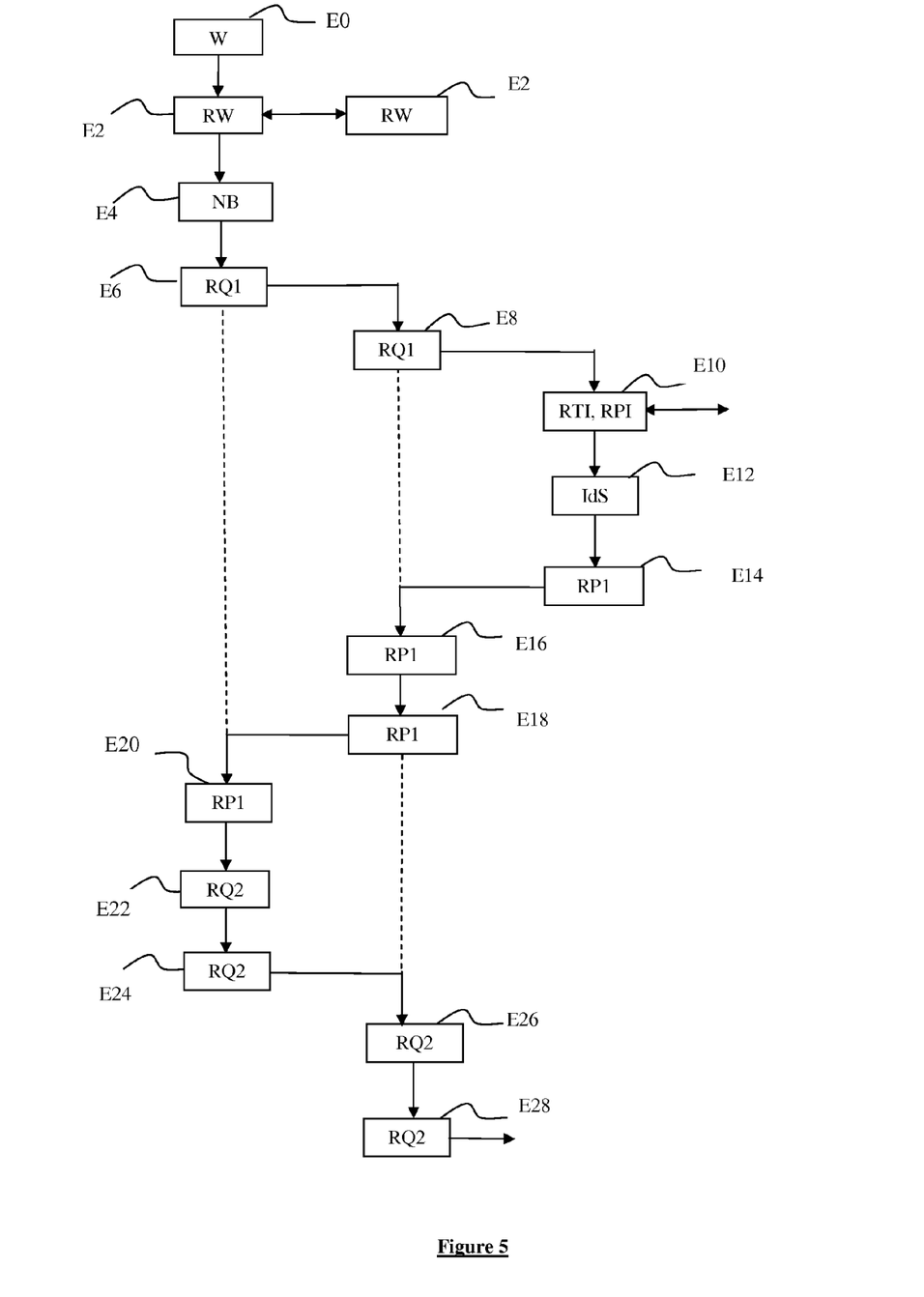
FIG. 5 is a flow chart showing the various steps of a method of setting up a communications session and a method of processing a request to set up a communications session in an implementation of the invention.

With reference to FIG. 5, there follows a description of an implementation of a method of setting up a communications session and a method of processing a request to set up a communications session as performed in the system SYS.

During a prior step E0, as a result of an action by the user A, an instance W of a web application is downloaded to the terminal TA.

In known manner, the instance W of the application is received and stored by the browser NV of the terminal TA in response to a download request transmitted by the browser NV of the terminal TA to a download server (not shown).

The received application instance W includes as a parameter an address AD of the connection server SW.

By way of example, the address AD is a uniform resource locator (URL) associated with the connection server SW.

As an alternative, the application instance W includes as a parameter at least one address of a service management server (not shown) suitable for communicating an address of a connection server.

During a prior step E2, e.g. following an action by the user A for launching the execution of the application instance W, the application instance W registers itself with the connection server SW.

More precisely, the connection module CNX of the terminal TA makes a request to the connection server SW to register the application instance W. The application registration module ENW of the connection server SW sets up a communications channel between the browser NV of the terminal TA and the connection server SW, and then registers said application instance W.

Figure 6:
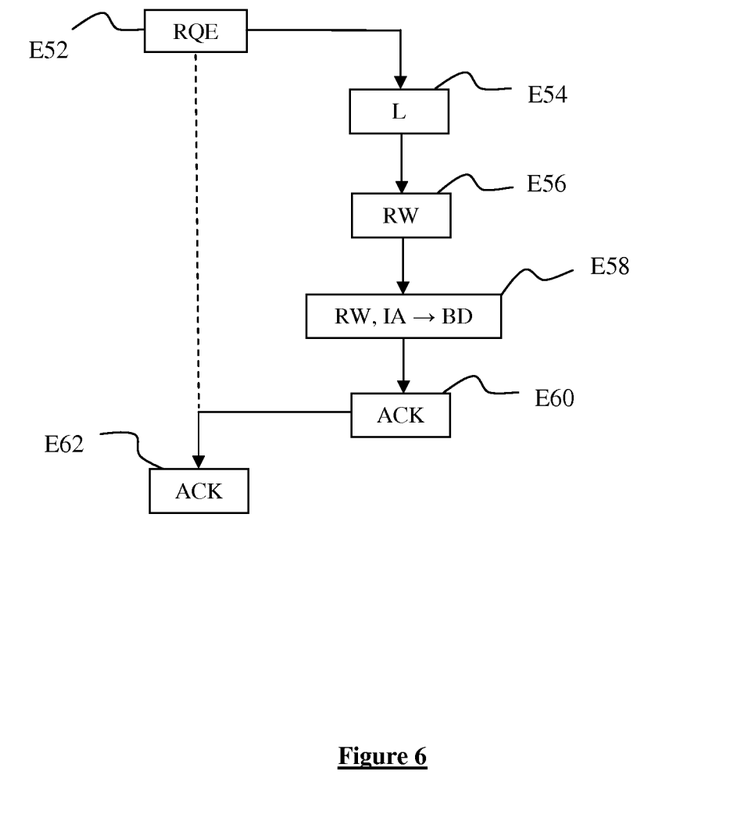
FIG. 6 is a flow chart showing the various steps of a method of registering an instance of an application in an implementation of the invention.

An implementation of a procedure for registering the application instance W with the connection server SW is described below with reference to FIG. 6.

The registration procedure makes it possible in particular for the connection server SW to determine an instance identifier RW and to register said instance identifier in the database BD in association with the identifier IA of the user A.

The user identifier IA is a reachability identifier for the user A, for example a telephone number of a terminal of the user A, e.g. of the terminal TA, or a messaging address of the user A. The user identifier IA is specific to the user A. It serves to identity the user A in unique manner.

In the implementation described, the determined instance identifier RW is transmitted to the terminal TA by the connection server SW.

During a step E4, the processor module TT of the terminal TA obtains an identifier NB of the terminal TB.

By way of example, the identifier NB is a 10-digit telephone number input by a user of the terminal TA acting on a user interface of the terminal TA.

The step E4 is followed by a step E6 during which the first send module TR1 of the terminal TA sends a first communications setup request RQ1 to the connection server SW.

The first communications setup request RQ1 contains the instance identifier RW of the application instance W and the identifier NB of the terminal TB.

The terminal TB constitutes a called entity.

The first request RQ1 also contains a command identifier indicating that the first request RQ1 is a request to set up a communications session.

By way of example, the first request is encoded in the JavaScript Object Notation (JSON) format.

The first communications setup request RQ1 is formulated in a first protocol PT1.

During a step E8, the connection server SW receives the first request RQ1 and sends this first request RQ1 to the management server SL.

More precisely, the request RQ1 is received by the first reception module RE1 of the connection server SW and is sent to the management server SL by the processor module TTS of the connection server SW.

As an alternative, when the instance identifier RW is not sent to the terminal TA during the registration stage, the first request RQ1 includes an identifier IA of the user A, e.g. an email address of the user A, and the connection server SW replaces the user identifier IA in the request RQ1 with the instance identifier RW before sending the first request RQ1 to the management server SL.

Also as an alternative, the management server SL may replace the user identifier IA contained in the request RQ1 by the instance identifier RW.

During a step E10, the communications module COM of the management server SL receives the first request RQ1 and the processor module TTL of the management server SL sends a processing request RTI to the database BD, which request contains the identifier NB of the terminal TB as contained in the received first request RQ1. Since the identifier of the terminal TB is not an identifier of a web application, it is not referenced as such in the database BD and the management server SL receives a response RPI to the processing request RTI indicating that the identifier NB is not present in the web application registration database of the database BD.

The response RPI is received by the communications module COM of the management server SL. This response is interpreted by the management server SL as meaning that the identifier NB contained in the first request RQ1 is not an identifier of a web application and that the communications session needs to be set up using a second protocol PT2.

In the presently described implementation, the second protocol PT2 is the session initiation protocol (SIP).

In a step E12, the determination module DET of the management server SL determines a session identifier IdS.

The session identifier IdS is a unique identifier generated by the management server SL. By way of example, the session identifier IdS is generated from the instance identifier RW of the web application W and the identifier NB of the terminal TB converted into SIP format.

For example, the session identifier IdS is generated by symmetrical encryption of a data string formed by concatenating the instance identifier RW converted into SIP format with the identifier of the terminal TB converted into SIP format. A random value, such as a timestamp, for example, may be added to this data, e.g. to limit the duration for which the session identifier is valid.

The session identifier IdS is constructed so as to be incapable of being falsified or predicted by the application instance W.

As an alternative, a unique session identifier is generated by some other method known in the state of the art.

During a step E14, the construction module CRP of the management server SL constructs a response RP1 to the first request RQ1 and the communications module COM of the management server SL sends the constructed response RP1 to the connection server SW.

The response RP1 indicates that the first request RQ1 is not valid since it cannot be routed all the way to the called entity. In other words, the response RP1 indicates that it is impossible to route the first request RQ1.

By way of example, the response RP1 contains a text type message or an error code indicating that the communications session cannot be set up when using the protocol PT1.

As an alternative, the response RP1 indicates that the entity TB must be reached while using the SIP protocol.

By way of example, the response RP1 contains a second protocol identifier specifying the protocol to be used for reaching the entity TB. A second protocol identifier constitutes an example of a second protocol parameter.

Also by way of example, the indication contained in the response RP1 that the first request cannot be routed may be implicit.

In the presently-described implementation, the response RP1 contains the session identifier IdS, the identifier of the calling entity, i.e. the instance identifier RW of the web application instance W, after conversion into the SIP uniform resource identifier (URI) format together with the identifier of the called entity TB converted into the SIP-URI format.

By way of example, the identifiers of the calling entity and of the called entity in the SIP-URI format may be obtained by consulting the routing table contained in the database BD.

As an alternative, format conversion is performed by the management server SL by applying predefined conversion rules.

The identifiers of the calling entity and of the called entity in the SIP-URI format constitute second protocol parameters.

In the implementation described, the response RP1 also contains routing information for the SIP call that is to be generated. This routing information may for example be portability information or a prefix for adding to the identifier of the called entity. The routing information also constitutes second protocol parameters.

By way of example, the response RP1 is a "switch protocol to SIP" message containing the data of the SIP call (calling number, called number).

As an alternative, the response RP1 does not contain a session identifier.

The response RP1 is received by the connection server SW during a step E16.

During a step E18, the first send module EV1 of the connection server SW sends the response RP1 to the application instance W.

The response RP1 is received by the first receive module RR1 of the terminal TA in a step E20.

During a step E22, the processor module TT of the terminal TA constructs a second communications session setup request RQ2.

The second request RQ2 is formulated in a second protocol PT2.

In the presently-described implementation where the second protocol PT2 is SIP, the second request RQ2 is an SIP request, e.g. an SIP INVITE message.

For example, the instance identifier RW converted to the SIP-URI format is used to form a "from" type header, the identifier BB in the SIP-URI format is used to form a "to" type header, and the session identifier IdS is inserted in an extension field, e.g. referred to as an "X-MCOP-COOKIE" field.

The identifier of the application instance RW as converted into SIP format, the identifier NB of the terminal TB in SIP format, and the session identifier IdS may all be extracted from the response RP1, for example.

As an alternative, the identifier of the application instance RW converted into SIP format and/or the identifier NB of the terminal TB in SIP format are obtained by the terminal TA making a specific request to the management server SL or to the database BD.

During a step E24, the second send module TR2 of the terminal TA sends the second request RQ2 to the connection server SW.

The step E24 is followed by a step E26 during which the second request RQ2 is received by the second receive module RE2 of the connection server SW.

Likewise, during the step E26, the processor module TTS of the connection server SW extracts the session identifier IdS from the received second request RQ2 and verifies the validity of the extracted session identifier.

It is specified that the session identifier IdS can be generated only by the management server SL, but that the session identifier can be verified by other entities.

When the session identifier IdS is valid, the connection server SW forwards the second request RQ2 to the terminal TB via the processor server ST (step E28).

When the session identifier IdS is not valid, the connection server SW does not forward the second request RQ2 and the second send module EV2 of the connection server SW sends a response to the second request RQ2 to the web application instance W of the terminal TA indicating that the communications session cannot be set up. The response to the second request RQ2 indicates a refusal to set up the communications session. The response to the second request RQ2 is then received by the receive module RR2 of the terminal TA.

In conventional manner, reception of the second request RQ2 by the terminal TB triggers negotiation to set up a communications session by exchanging signaling messages and then exchanging one or more media streams between the application instance W and the terminal TB.

The steps E6, E20, E22, and E24 performed by the terminal TA constitute the steps of the method of setting up a communications session.

The steps E8, E14, E16, E18, E26, and E28 performed by the connection server SW constitute the steps of the method of processing a request to set up a communications session.

In a variant implementation, the second request RQ2 constructed during the step E22 is sent by the terminal TA during the step E24 directly to the processor server ST. In this variant, the session identifier IdS is verified by the processor server ST.

In the implementation described, the first protocol PT1 is a web protocol and the second protocol PT2 is SIP.

The invention also applies to other protocols. For example, the first protocol could be SIP and the second protocol could be a web protocol.

As an alternative, the second protocol may be selected from a plurality of protocols by the server SL as a function of the called entity TB.

A particular implementation of registering the web application W with the connection server is described below with reference to FIG. 6.

During a step E52, e.g. resulting from the user performing an action on the terminal TA to launch execution of the application instance W, the application instance W sends a connection setup request RQE to the connection server SW by means of the address AD received as a parameter when downloading the application instance W.

As an alternative, the address AD of the connection server SW is not received during the downloading stage and the address AD of the connection server SW is received by the application instance W in response to an address request made with a service management server at an address that was received as a parameter during the downloading of the application instance W.

Also as an alternative, the address AD of the connection server SW may be obtained by the application instance W performing a domain name system (DNS) type search.

The connection setup request RQE is received by the connection server SW during a step E54, and the connection server SW sets up a communications channel L with the browser NV. By way of example, the communications channel L is a Websocket type connection.

In known manner, the communications channel L enables communication to take place between the connection server SW and the browser NV, and consequently enables communication to take place between the connection server SW and the application instance W.

During a step D56, the connection server SW causes an instance identifier RW to be determined for the application instance W.

In the presently described implementation, the instance identifier RW is determined by the connection server SW.

As an alternative, the instance identifier RW could be determined by a host server or by a central server.

The instance identifier RW comprises a first identifier ID1 and a second identifier ID2.

The second identifier ID2 serves to identify a host server within the network R. It is a pointer to this host server. The host server is a connection server or some other server.

When the host server is not the connection server associated with the application instance, the first identifier ID1 is a value or a character string serving firstly to enable the host server to identify a connection server and secondly to enable the identified connection server to identify the communications channel L.

The first identifier ID1 represents the web application instance W in unique manner in the host server.

It enables the connection server SW to identify the communications channel L and consequently to identify the web application instance W from among the application instances that are connected thereto. It constitutes a local pointer to the communications channel L.

In the presently-described implementation in which the connection server SW constitutes a host server, the second identifier ID2 serves to identify the connection server SW within the network R, and the first identifier ID1 is a value or a character string enabling the connection server SW to identify the communications channel L.

By way of example, the second identifier ID2 is a domain name associated with the connection server SW.

By way of example, the second identifier ID2 is an absolute domain name, also known as a fully qualified domain name (FQDN), i.e. a domain name that gives the absolute position of a node representing the connection server SW in the tree structure of the network R and specifying all of the higher level domains as far as the root.

For example, the second identifier ID2 might be "server45.communications.orange.fr".

As an alternative, the second identifier is a relative domain name, e.g. "communications.orange.fr". In this variant, generation of the first identifier ID1 may be centralized by way of example within the domain and the connection server SW needs to refer to a central entity, e.g. a database, in order to obtain all or part of the first identifier ID1.

Also by way of an alternative, the first identifier ID1 may be determined using predefined determination rules. For example, each first identifier ID1 may include a prefix identifying the connection server SW. In another example, number ranges are allocated to each connection server by a central server, and the connection server SW allocates the first identifier ID1 as a function of the range that has been allocated thereto.

The instance identifier RW may be obtained by way of example by concatenating the first identifier ID1 and the second identifier ID2.

By way of example, the instance identifier is a URI.

By way of example, the instance identifier RW is of the form: "rsi: IDI@ID2" where "rsi" is a term identifying an instance identifier.

The connection server SW registers the instance identifier RW in a correspondence table of the connection server SW in association with a connection identifier IC. The connection identifier IC is a value or a character string enabling the connection server SW to find the communications channel L associated with the application instance W from among the various established connection channels.

By way of example, the connection identifier IC is an identifier of the communications channel L.

In a step E58, the connection server SW causes the instance identifier RW to be registered in association with a user identifier IA in the database BD.

The user identifier IA is a reachability identifier for the user A, e.g. a telephone number of the terminal of the user A, e.g. of the terminal TA, or else it is a messaging address for the user A. The user identifier IA is specific to the user A. It enables the user A to be identified in unique manner.

By way of example, the user identifier IA is contained in the connection setup request RQE.

As an alternative, the user identifier IA may for example be obtained in response to a user identifier request sent to an identity server (not shown) and containing proof of the identity of the user A. By way of example, the proof of identity may be obtained during a prior stage of authenticating the user A, e.g. with the help of a login/password pair, and it is sent in the connection setup request RQE.

As an alternative, the instance identifier RW is registered and the user identifier IA is obtained by a registration server (not shown), and the step E58 is a step of sending a request to this registration server to register the web application instance W. The registration request contains the instance identifier RW as generated during the step E56.

As an alternative, the registration request also contains service information.

During a step E60, the connection server SW sends an acknowledgment message ACK to the application instance W via the communications channel L and the browser NV.

The acknowledgment message ACK constitutes proof that the communications channel L has been set up.

The acknowledgment message ACK contains the instance identifier RW.

As an alternative, the acknowledgment message ACK does not contain the instance identifier RW.

The acknowledgment message ACK is received by the application instance W during a step E62, and a message informing the user that the connection has been established may for example be displayed on a graphics interface of the browser NV.

The instance identifier serves to identify the application instance in unique manner within the network. The second identifier serves to address a host server. The first identifier then makes it possible for the host server to identify the associated connection server, and then enables the connection server to identify the application instance that is to be contacted from among the application instances that are connected thereto.

Although the present disclosure has been described with reference to one or more examples, workers skilled in the art will recognize that changes may be made in form and detail without departing from the scope of the disclosure and/or the appended claims.

The invention claimed is:

1. A method of setting up a communications session between an instance of a web application installed in a terminal and a called entity, the method comprising the following acts performed by said terminal:

sending to a first server, via a connection server, a first request to set up a communications session between said application instance and said called entity, said first request being formulated in a first protocol, directed to the called entity and containing an identifier of the called entity, wherein the first server is configured to receive and send messages according to the first protocol;

receiving, if said called entity identifier is not associated with a web application instance in a web application registration database, a response to said first request, sent from the first server via the connection server, indicating that the called entity identifier is not present in the web application registration database and thus it is not possible for said first server to route said first request all the way to the called entity using the first protocol, wherein the web application registration database associates entity identifiers with respective web application instances, said response containing a session identifier generated from an instance identifier of the web application and the called entity identifier of the called entity converted into the second protocol by said first server; and after receiving said response, sending a second request to a second server, via the connection server or directly to the second server, to set up said communications session, wherein said second request corresponds to the first request, contains said session identifier, is formulated in a second protocol and is directed to the called entity, wherein the second server is configured to receive and send messages according to the second protocol, wherein validity of the session identifier is verified by the connection server or by the second server, and wherein the second request is transmitted to the called entity only if it is determined that the session identifier is valid.

2. A method of setting up a communications session according to claim 1, wherein the second protocol is a session initiation protocol and the response to the first request contains an instance identifier of the web application of the terminal and the identifier of the called entity converted into the SIP uniform resource identifier.

3. A method of setting up a communications session according to claim 1, wherein said response contains at least one second protocol parameter.

4. A method of setting up a communications session according to claim 1, wherein said first request contains the instance identifier of said web application instance of the terminal and the called entity identifier of the called entity, said instance identifier being obtained during a prior registration step.

5. A method of setting up a communications session according to claim 1, wherein the method includes receiving a response to said second request, said response indicating a refusal to set up a communications session in the event of said session identifier being invalid.

6. A method of processing a request to set up a communications session between an instance of a web application installed in a terminal and a called entity, the method comprising the following acts performed by a connection server:

receiving a first request from the terminal to set up a communications session between said web application instance and said called entity, said first request being formulated in a first protocol, directed to the called entity and containing an identifier of the called entity, and directing the first request from the connection server to the called entity via a first server, wherein the first server is configured to receive and send messages according to the first protocol;

receiving, if said called entity identifier is not associated with a web application instance in a web application registration database, a response from the first server to said first request indicating that the called entity identifier is not present in the web application registration database and thus it is not possible for the first server to route said first request all the way to the called entity according to the first protocol, wherein the web application registration database associates entity identifiers with respective web application instances, said response containing a session identifier generated from an instance identifier of the web application and the called entity identifier of the called entity converted into the second protocol by said first server;

sending the response to the terminal; and after sending said response, receiving a second request from the terminal for setting up said communications session, wherein said second request corresponds to the first request, contains said session identifier and is formulated in a second protocol, and directing the second request from the connection server to the called entity via a second server, wherein the second server is configured to receive and send messages according to the second protocol, and wherein validity of the session identifier is verified by the connection server or by the second server, and wherein the second request is transmitted to the called entity only if it is determined that the session identifier is valid.

7. A terminal comprising:

a non-transitory computer-readable medium comprising instructions stored thereon;

a processor configured by the instructions to perform acts comprising:

sending a first request to a first server, via a connection server, for setting up a communications session between an instance of a web application and a called entity, said first request being formulated in a first protocol directed to the called entity and containing an identifier of the called entity, wherein the first server is configured to receive and send messages according to the first protocol;

receiving, if said called entity identifier is not associated with a web application instance in a web application registration database, a response to said first request, from the first server via the connection server, indicating that the called entity identifier is not present in the web application registration database and thus it is not possible for the first server to route said first request all the way to the called entity using the first protocol, wherein the web application database associates entity identifiers with respective web application instances, wherein the web application registration database associates entity identifiers with respective web application instances, said response containing a session identifier generated from an instance identifier of the web application and the called entity identifier of the called entity converted into the second protocol by said first server; and sending to a second server, via the connection server or directly to the second server, and after said response has been received, a second request for setting up said communications session, wherein said second request corresponds to the first request, contains said session identifier, is formulated in a second protocol and is directed to the called entity, wherein the second server is configured to receive and send messages according to the second protocol, and wherein validity of the session identifier is verified by the connection server or by the second server, and wherein the second request is transmitted to the called entity only if it is determined that the session identifier is valid.

8. A connection server comprising:

a non-transitory computer-readable medium comprising instructions stored thereon;

a processor configured by the instructions to perform acts comprising:

receiving a first request from a terminal for setting up a communications session between an instance of a web application installed in the terminal and a called entity, said first request being formulated in a first protocol, directed to the called entity and containing an identifier of the called entity, and directing the first request from the connection server to the called entity via a first server, wherein the first server is configured to receive and send messages according to the first protocol;

receiving, if said called entity identifier is not associated with a web application instance in a web application registration database, a response from the first server to said first request indicating that the called entity identifier is not present in the web application registration database and thus it is not possible for the first server to route said first request all the way to the called entity according to the first protocol, wherein the web application registration database associates entity identifiers with respective web application instances, said response containing a session identifier generated from an instance identifier of the web application and the called entity identifier of the called entity converted into the second protocol by said first server;

sending the response to the terminal; and receiving from the terminal, after sending said response, a second request for setting up said communications session, wherein said second request corresponds to the first request, contains the session identifier and is formulated in a second protocol, and directing the second request from the connection server to the called entity via a second server, wherein the second server is configured to receive and send messages according to the second protocol, and wherein validity of the session identifier is verified by the connection server or by the second server, and wherein the second request is transmitted to the called entity only if it is determined that the session identifier is valid.

\* \* \* \* \*